(12) United States Patent
Maleta et al.

(10) Patent No.: US 8,158,073 B2
(45) Date of Patent: Apr. 17, 2012

(54) MASS EXCHANGE CONTACT DEVICE

(76) Inventors: Bogdan Maleta, Yagotin (UA); Olesja Maleta, Yagotin (UA)

( * ) Notice: Subject to any disclaimer, the term of this patent is extended or adjusted under 35 U.S.C. 154(b) by 195 days.

(21) Appl. No.: 12/800,268

(22) Filed: May 12, 2010

(65) Prior Publication Data
US 2010/0221156 A1 Sep. 2, 2010

Related U.S. Application Data

(63) Continuation-in-part of application No. 12/225,575, filed as application No. PCT/UA2007/000021 on Apr. 3, 2007, now abandoned.

(30) Foreign Application Priority Data

Apr. 10, 2006 (UA) .................................. 2006/03889

(51) Int. Cl.
*B01J 8/02* (2006.01)
*B01J 35/02* (2006.01)
*B01J 10/00* (2006.01)
*B01J 19/00* (2006.01)
*B01J 8/00* (2006.01)
*F02M 29/04* (2006.01)

(52) U.S. Cl. ........ 422/211; 422/129; 422/187; 422/600; 422/607; 261/94; 261/108; 261/114.4

(58) Field of Classification Search ............... 422/129, 422/187, 600, 607, 211; 261/94, 108, 114.1–114.4
See application file for complete search history.

(56) References Cited

FOREIGN PATENT DOCUMENTS
RU 2237508 C1 * 10/2004
* cited by examiner

*Primary Examiner* — Walter D Griffin
*Assistant Examiner* — Natasha Young
(74) *Attorney, Agent, or Firm* — Aleksandr Smushkovich

(57) ABSTRACT

A mass-exchange contact device is proposed, comprising an upper tray, contact element including a barbotage unit configured as an inner cap with strips tangently bent out, a lower tray, a casing including a ring-shaped descending limiter, windows circumferentially disposed on the casing's walls (lower row), orifices circumferentially disposed on the casing's walls (upper row) above the windows, a double-acting valve composed of an upper and lower plates fixedly attached to a distance rod, and a cover bushing disposed coaxially to and around the upper region of casing embracing the contact element. Embodiments comprise a number of rows of the proposed devices situated one above the other, and separated by multi-layer packing fittings. In catalytic distillation columns, the fittings can be filled with catalytic material. Alternatively, the fitting is substituted with a grating that supports a catalytic granular layer. The device allows improving operation, reliability, durability, reducing its weight and costs.

5 Claims, 11 Drawing Sheets

MASS EXCHANGE CONTACT DEVICE

CROSS-REFERENCE TO RELATED APPLICATIONS

This U.S. patent application is a continuation-in-part application of a pending U.S. patent application Ser. No. 12/225,575 (herein further referred to as "parent application") filed on 24 Sep. 2008, entitled "Mass exchange contact device", being a U.S. national phase application of a PCT application PCT/UA2007/000021 filed on 3 Apr. 2007, published as WO2007/117227, which PCT application claims priority of a Ukrainian patent application UA2006/03889 filed on 10 Apr. 2006, now Patent of Ukraine 5fo81700. The foregoing PCT applications and Ukrainian applications are hereby entirely incorporated by reference. The U.S. patent application Ser. No. 12/225,575 is hereby expressly abandoned.

FIELD OF THE INVENTION

The invention relates to mass exchange contact devices, namely to the devices used for performing mass exchange processes in a gas (steam)-liquid system in the conditions of a cyclic mode (at separate movements of the gas/liquid phases in a column) and can be used in the food, chemical, petrochemical, oil-processing, and other industries.

BACKGROUND OF THE INVENTION

There is known a mass exchange contact device comprising a plate face with contact elements. The plate face includes ring-shaped holes with cross-pieces, which holes are disposed along the periphery of the contact elements. A central hole is disposed under the contact element, a branch pipe and a ring are mounted on the axe of central hole. The ring is equipped with a movable double-acting valve arranged in the middle thereof. The valve is made of plates with central holes, wherein the plates are connected by means of distance poles. The upper hole is used for passing the branch pipe. An interrupting valve is mounted on a rod situated between limiters of ascending and descending under the lower hole (USSR inventor certificate No. 1307643).

The disadvantages of the mentioned device are: it's composed of two movable parts; there is a restriction of the opening cross-section of branch pipe for passing gas (steam), as well as a restriction of the ringed holes' opening cross-section for a liquid flow. These disadvantages increase the plate's hydraulic resistance at the time of gas (steam) passing, and the time of transferring liquid from one plate to another.

A mass exchange contact device has been described in the U.S. parent application Ser. No. 12/225,575 filed by the instant inventors. The 'parent' mass exchange contact device includes an upper tray associated with a contact element, a casing, a movable double-acting valve, lifting and descending limiters. The casing has an upper row of orifices and a lower row of windows, the rows are situated along the casing's perimeter, and the movable valve is composed of two plates installed one above the other and connected by a distance rod. The parent device is equipped with an additional lower tray.

The contact element serves as a limiter for lifting the double-acting valve and the bottom edge of the casing serves as a limiter for descending the valve. The lower edges of the windows are made at the level of the lower tray. The contact element comprises a specific barbotage unit made in the form of an inner cap with tangently bent strips. The height of the windows is essentially equal to the height of the double-acting valve, and in the ending positions of the double-acting valve, the lower plate divides the opening of windows into equal sections.

The efficiency of the 'parent' device however can be increased by dividing the barbotage space into a number of layers thereby enlarging the mass-exchange surface, which is disclosed herein further.

For example, U.S. Pat. No. 5,523,062 teaches: "A distribution element is provided which may be used in packed columns to redistribute the gas and liquid flow evenly across the column. Most simply the element comprises a corrugated plate having openings only at the peaks and valleys of the corrugation. There are no openings in the sloped sides of the corrugations. The distribution element is spaced within the packing to most advantageously utilize the redistribution characteristics of the element for a given system." The U.S. Pat. No. 5,523,062 is hereby entirely incorporated by reference.

Another U.S. Pat. No. 6,206,349 describes: "Fluid—fluid contacting apparatus is provided with a structured packing comprising a series of packing elements fabricated from sheets of crimped material in such a way that the corrugations in each sheet extend obliquely with respect to the direction of bulk fluid flow through the apparatus. Each packing element is oriented with the sheets thereof in a plane which is angularly displaced with respect to the sheets of neighboring elements. A mechanism is provided at or in the vicinity of the interface between neighboring elements for reducing the pressure drop imposed on the continuous phase as it passes from one element to the next." The U.S. Pat. No. 6,206,349 is hereby entirely incorporated by reference.

Another U.S. Pat. No. 6,513,795 discloses "A layer of mixed-resistance structured packing includes: a first structured packing having a first packing resistance; and a second structured packing generally horizontally adjacent the first structured packing, the second structured packing having a second packing resistance different than the first packing resistance. The layer of mixed-resistance structured packing is used in exchange columns for exchanging heat and/or mass between a first phase and a second phase in processes such as cryogenic air separation. Use of the layer of mixed-resistance structured packing reduces HETP (height equivalent to a theoretical plate) in the exchange columns and processes. A method also is provided for assembling the layer of mixed-resistance structured packing in an exchange column." The U.S. Pat. No. 6,513,795 is hereby entirely incorporated by reference.

A disadvantage of the above-mentioned devices is that the volatile phase changes its speed along the height of the column due to varying the share of the volatile phase. Therefore, the ascending volatile phase flow cannot stably support the liquid phase in a cyclic mode. This leads to the fact that the liquid phase falls down within the lower speed sections of the column, whereas the liquid phase is pushed out within the higher speed sections of the column. Hence, empty zones appear within the structured packing elements, the phases move unevenly, causing low separation efficiency. This prevents arranging an efficient mass-exchange process with separate movements (i.e. in a cyclic mode) of the phases in the column. This disadvantage is conditioned by the fact that the packing element creates a resistance to the liquid phase moving along the mass-exchange tray, and a mass-exchange surface is formed only due to barbotage.

The mentioned above devices have also another disadvantage of stochastic formation of the mass-exchange surface on the trays, while the liquid is intermingled throughout the whole volume of liquid phase.

Another U.S. Pat. No. 4,471,154 teaches: "A distillation-reactor for separating constituents of a feedstock having similar boiling points includes at least one stage with containing screens defining a series of containment volumes for a heterogeneous particulate catalyst. The catalyst is fluidized within the volumes defined by the containing screens by the action of vapor passing through the tray. Liquid flowing across the tray intimately contacts the fluidized catalyst and vapor without the occurrence of liquid back-up or high pressure drop." U.S. Pat. No. 4,471,154 is hereby entirely incorporated by reference.

Yet, another U.S. Pat. No. 5,536,699 teaches: "The packing having catalytic or adsorbent agents, which is provided for at least one fluid medium, comprises packing elements (10) disposed in stacks, which are assembled from layers aligned along the main direction of flow (2). The layers are formed by packing parts (1), the walls (2) of which are permeable for the medium. The packing parts contain a catalyst material (3). Between the packing parts are provided flow ducts, which intersect and are open to one another. According to the invention the layers are formed by a plurality of packing parts (1), the packing elements (10) comprise support structures (4) into which the packing parts are inserted, and the packing parts are substantially cylindrical." U.S. Pat. No. 5,536,699 is hereby entirely incorporated by reference.

A shortcoming of the devices described in the last two patents is that the amount of costly catalyst used is high, which makes the devices expensive. However, if one could increase the efficiency of dividing the components and enhance the uniformity of distribution of the catalyst, the required amount of catalyst would be reduced, making the device less expensive. The related art devices also cannot control the speed of chemical reactions, since they don't provide for regulation of the time of introduction of the volatile phase into the column.

BRIEF DESCRIPTION OF THE INVENTION

A first aim of the present invention is the improvement of known mass-exchange devices and methods for mass-exchange between a liquid phase component and a volatile phase component (i.e. gas, steam, etc. having a predetermined concentration that varies during the process) in light of the aforementioned deficiencies of the related art devices.

A second aim of the present invention is the reduction of the metal content (amount of metal consumed for making the device), the height, and costs of the device, increasing the reliability and durability of device operation. Other aims of the invention may become apparent to a skilled artisan upon learning the present disclosure.

The aforesaid aims are achieved particularly by providing an ordered alteration of the concentration of the volatile phase component along the height of the liquid phase layer and providing a predeterminedly extensive mass-exchange surface in the inventive mass exchange contact device.

In a first embodiment (according to the parent application Ser. No. 12/225,575), the parent mass exchange contact device comprises: an upper tray, a contact element fixed to the upper tray, which contact element 2 includes a bottom opening and a barbotage unit configured as an inner cap with strips tangently bent out; an additional lower tray disposed substantially in a parallel plane below the upper tray; a cylindrical casing including a bottom opening, a ring-shaped descending limiter formed inside the opening, a plurality of vertically extended windows circumferentially disposed on the substantially vertical walls of the casing (lower row) and a plurality of circular orifices circumferentially disposed on the walls of the casing (upper row) above the windows; a movable double-acting valve composed of an upper solid plate and a lower solid plate disposed above the plate, both the plates are fixedly attached to two ends of a distance rod substantially vertically situated; and a cover bushing disposed coaxially to and around the upper region of the casing, and embracing the contact element.

The aforesaid features of the first embodiment effect the following results:

1) The lifting force exerted on the valve during its upward movement increases due to the maximal possible pressure difference applied to the upper plate of the valve, as gas (steam) doesn't penetrate into the space over the upper plate.

2) During the passing of gas (steam) to the contact element over the upper plate of the valve through the row of orifices and the bushing's interior, the dynamic thrust of the steam flow is deployed as an additional force, for support of the valve in the upper position.

3) At a reducing or fluctuation of the gas (steam) expenditure for a fixed opening cross-section of the contact element for passing gas (steam) (for example 10%), meaning a decrease of pressure difference at the plate, the valve descends to the level of orifices row thereby creating a situational free cross-section for the flow of gas (steam) with a lower value (e.g. 2%), but still sufficient for support of the valve in the upper position due to stabilization of the pressure difference applied to the plate 4) At a smooth closing of the gas (steam) flow, the valve, moving downwards, reduces the speed of its movement at the level of orifices row, and mildly, without an impact, touches the lower limiter (the bottom edge of the casing), thereby extending durability of the valve.

In a second embodiment, the invention utilizes a number of rows of the inventive mass exchange contact devices, described in the first embodiment, which rows are vertically stacked above each other in a conventional column, and the rows are combined with a plurality of multi-layer packing fittings (e.g. the ones mentioned in the related art patents hereinabove, or similar) each vertically disposed above the corresponding row, wherein the mass-exchange between the liquid and volatile phases is conducted within the packing fitting. Each such multi-layer packing fitting is preferably configured as a corrugated member having peaks and valleys.

In a third embodiment, the invention utilizes a number of rows of the inventive mass exchange contact devices, described in the first embodiment, which rows are vertically stacked above each other in a column wherein a catalytic distillation takes place, and the rows each is combined with a multi-layer packing fitting vertically disposed above the corresponding row, wherein the mass-exchange between the liquid and volatile phases is conducted within the packing fitting. Each such multi-layer packing fitting contains a suitable catalytic material. Each such multi-layer packing fitting is preferably configured as a corrugated member having peaks and valleys.

In a fourth embodiment, the inventive method utilizes a number of rows of the inventive mass exchange contact devices, described in the first embodiment, which rows are vertically stacked above each other in a column wherein a catalytic distillation takes place, and the rows each is combined with a grating disposed above the corresponding row, and a granular layer of a suitable catalytic material placed on the grating, wherein the grating has holes of a predetermined size, and the granules of catalytic material have a minimal size greater than the predetermined size of the grating's holes.

Figure 1:
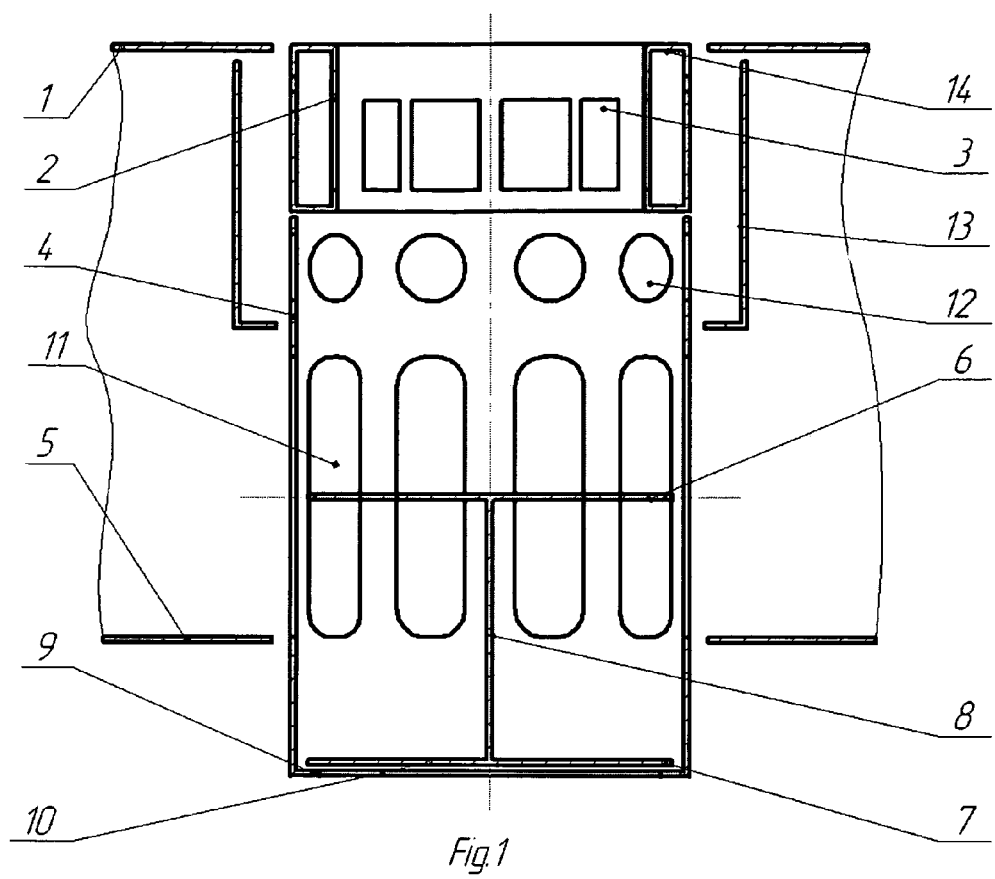
FIG. 1 is a view showing the mass exchange contact device at an initial moment of supplying gas (steam), according to the first embodiment of the present invention.
Figure 2:
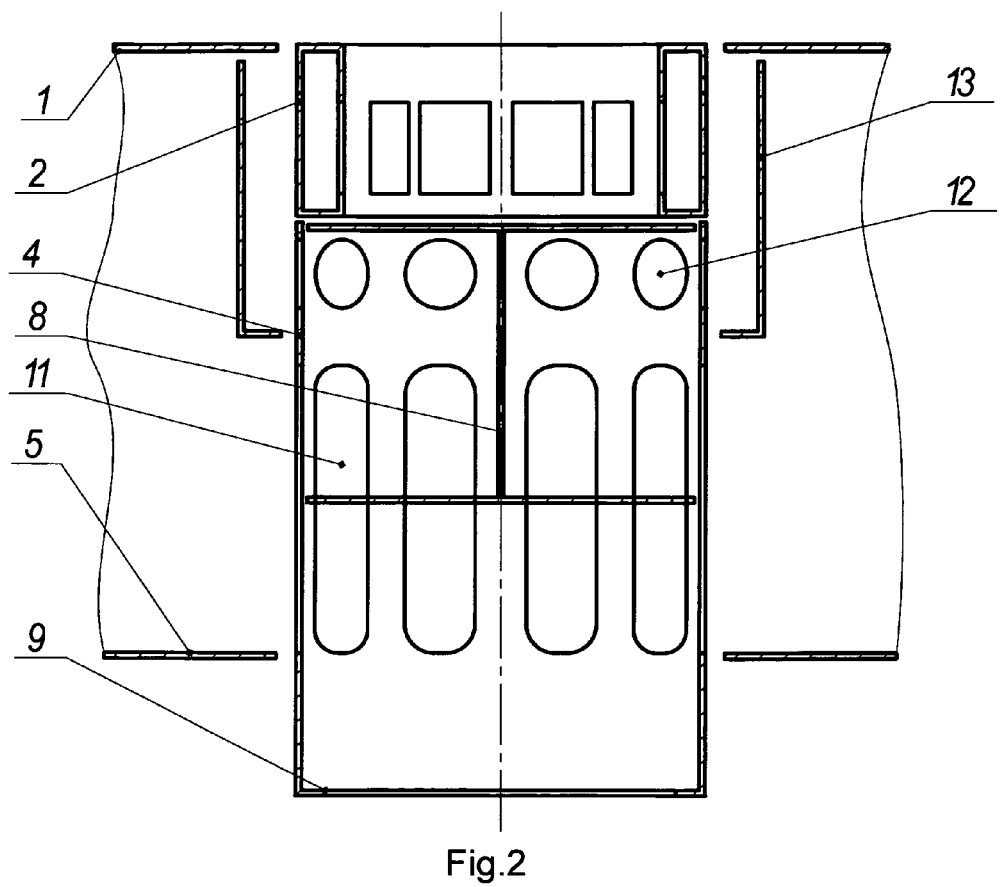
FIG. 2 is a view showing the device in at the moment of altering the exertion of lifting force from the lower plate to the upper plate of the valve, according to the first embodiment of the present invention.
Figure 3:
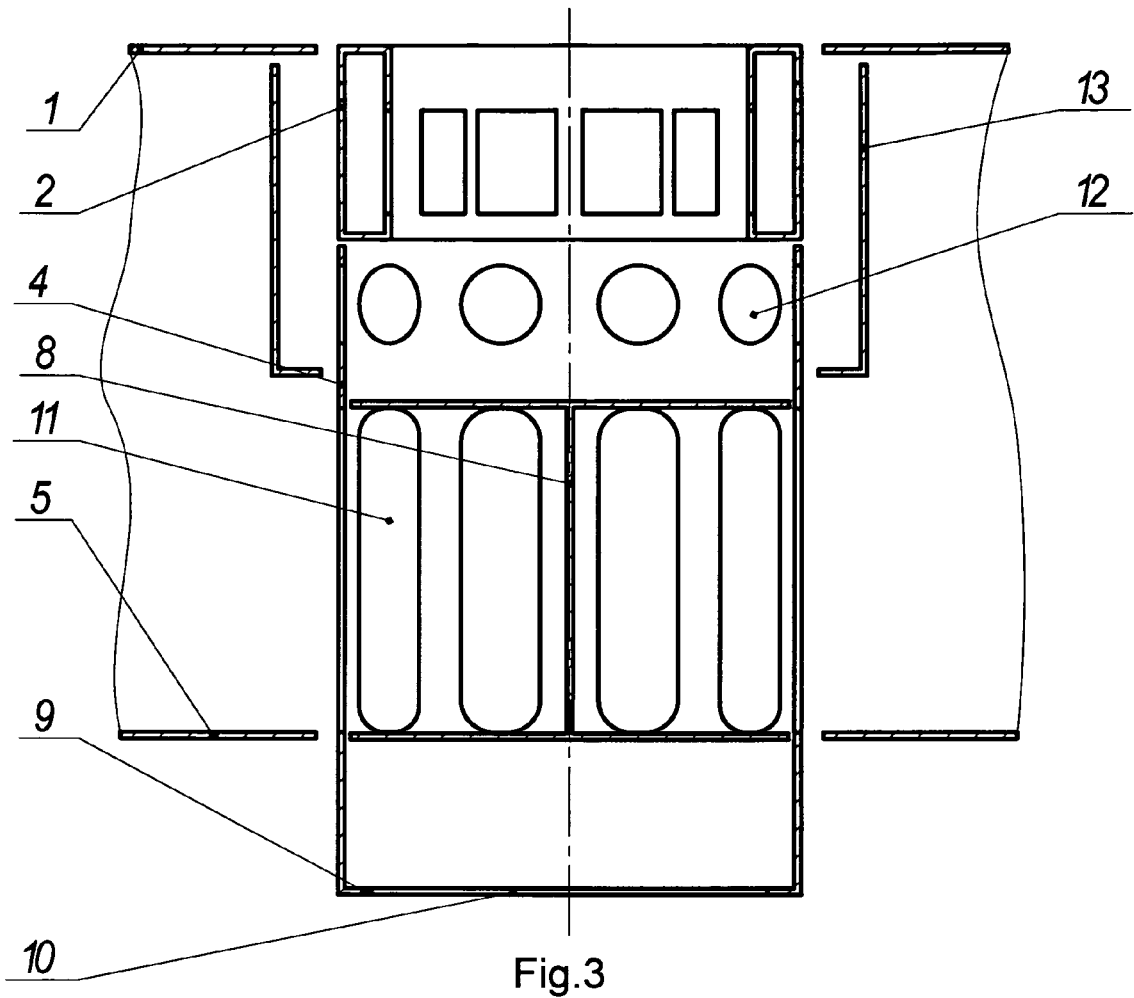
FIG. 3 is a view showing the mass exchange contact device at a position corresponding the subsequent moments of supplying gas (steam), according to the first embodiment of the present invention.
Figure 4:
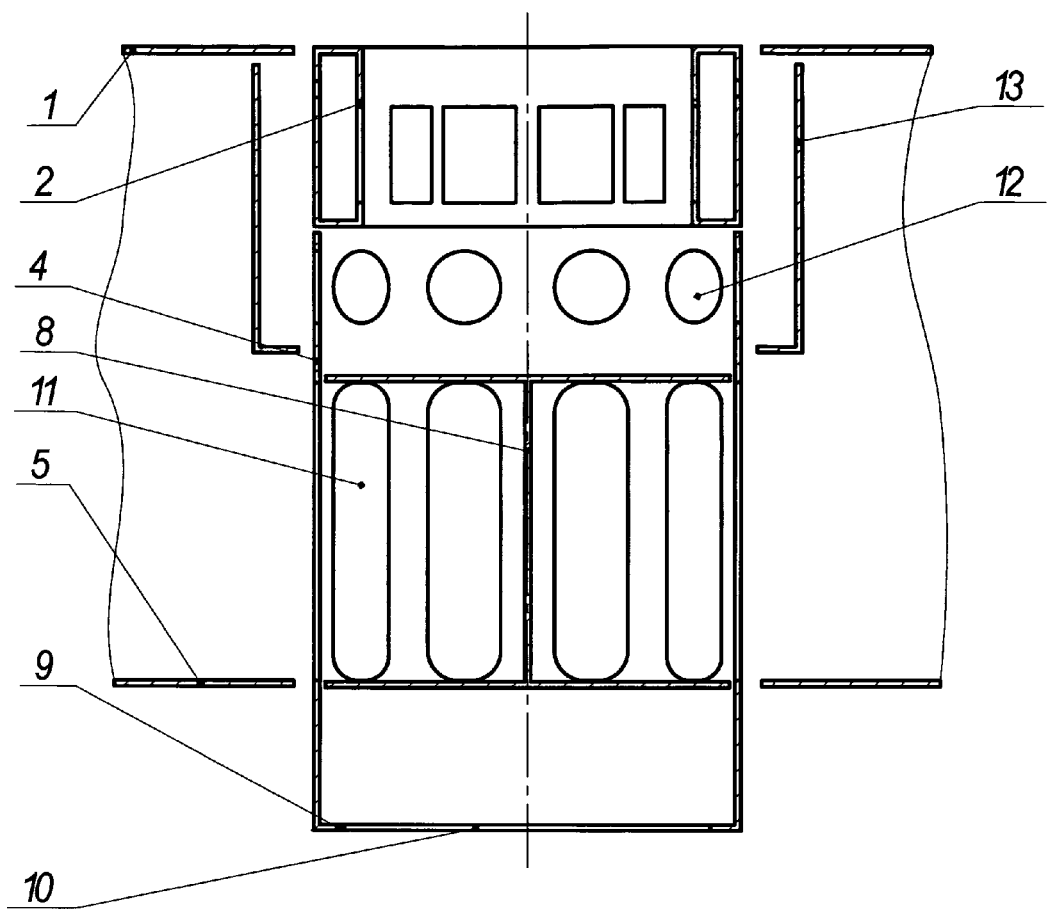
FIG. 4 is a view showing the mass exchange contact device at a position for creation of free situational cross-section for passing gas (steam), according to the first embodiment of the present invention.

Each reference numeral indicated on the drawings is designated to an element of the inventive structure described herein below. A first time introduced reference numeral in the description is enclosed into parentheses.

DETAIL DESCRIPTION OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

First Embodiment ('Parent')

As illustrated on FIGS. 1, 2, 3, and 4, the contact device comprises an upper tray (1), a contact element (2) fixed to the upper tray 1, which contact element 2 includes a bottom opening and a barbotage unit (14) configured as an inner cap with strips (3) tangently bent out; an additional lower tray (5) disposed substantially in a parallel plane below the upper tray 1; a cylindrical casing (4) including a bottom opening (10), a ring-shaped descending limiter (9) formed inside the opening 10, a plurality of vertically extended windows (11) circumferentially disposed on the substantially vertical walls of the casing 4 (lower row) and a plurality of circular orifices (12) circumferentially disposed on the walls of the casing 4 (upper row) above the windows 11; a movable double-acting valve composed of an upper solid plate (6) and a lower solid plate (7) disposed above the plate 6, both the plates are fixedly attached to a distance rod (8) substantially vertically situated; and a cover bushing (13) disposed coaxially to and around the upper region of the casing 4, and embracing the contact element 2.

The contact element 2 also functions as a limiter for lifting the valve i.e. restricting the upward movement of the valve, whereas the bottom edge of the casing 4 functions as a limiter for lowering the valve i.e. restricting the downward movement of the valve, the bottom edges of the windows 11 are disposed at the level of the lower tray 5, and the exterior of the contact element 2 is communicated with the interior of the casing 4 via the inner space of the bushing 13 and via the orifices 12. Optionally, the upper row of orifices and the lower row of windows in the casing can made as continuous holes, i.e. united in one row of openings.

The contact device operates in the following way:

During a 'steam period', the gas (steam) phase lifts the movable valve to a predetermined upper position (shown on FIG. 2) in a way that the upper plate closes the bottom opening of the contact element 2. Steam getting under the upper plate 6 through the orifices 12 and the bushing 13 enters the barbotage unit 14 and passes through the liquid layer therein.

At the end of steam period, the valve under the action of its weight and liquid contained therein moves down, reducing the movement speed at the level of the row of orifices 12, and gently descends on the limiter 9. The liquid from the barbotage zone on the tray 1, passes through the windows 11 and gets into the volume limited by the casing 4, the lower tray 5, and the movable valve (transient volume).

The delay time of supplying gas (stem) will be determined by the time of evacuation of liquid from the tray 1 into the transient volume and it will typically take several seconds.

At the initial moment of gas (steam) getting to the bottom plate 7, the lifting force is acting caused by the pressure difference. This force will move the valve upwards together with the liquid contained in the transient volume.

At the moment when the plates reach the level of windows 11, the point of exertion of the lifting force changes from the lower plate 7 to the upper plate 6. At this moment the pressure difference is still maximal, so is the lifting force on the plate 6, since gas (steam) does not pass via the bushing 13 into the space above the plate 6.

Gas (steam) passes however into the windows of the casing 4 due to the process of barbotage. In the course of increasing the active cross-section of the windows, the speed of steam flow is falling that conditions the transfer of liquid into the lower tray 5.

The movable valve continues moving upwards up to a predetermined position. The total weight of the valve and of the liquid above the valve must be less than the lifting force caused by the pressure difference. The time of pouring liquid from one tray to the other is called 'liquid period'. Thusly, the cycle time, consisting of the gas period and the liquid period, will end at this moment. The following cycles will proceed in an analogous manner.

The proposed mass exchange contact device allows providing the mass-exchange process for a gas (vapor)-liquid system in a cyclical mode with at a single change of the liquid delay simultaneously in all trays along the height of column, broadens the operation range of loads with respect to liquid and vapor, raises productivity, improves reliability and durability of the device.

The use of the proposed device allows avoiding the intermingling of liquid at the adjacent stages of contact, and permits increasing the efficiency of mass exchange by two or three times relatively to the traditional regular process.

Second Embodiment ('Continuation')

A common problem of the related art devices can be described as follows: an ideal mass-exchange process for separate movements of the liquid and volatile phases envisages a 100% intermingling of the phases during the introduction of the volatile phase, whose concentration changes during the mass-exchange process. In case of the 100% intermingling, the change of concentration $x_n$ of the volatile phase occurs during a time t of passage of the volatile phase throughout an entire volume of the liquid phase according to a dependence of $dx_n/dt$. However, if one could orderly alter the concentration of the volatile phase along a height (z) of the liquid phase component, it would lead to an increase of the efficiency of separation of the liquid and volatile components on the mass-exchange tray according to a dependency of $d^2x_n/dtdz$.

This problem is herein solved in the second embodiment of inventive device/method for improvement of mass-exchange between a volatile phase and a liquid phase within a conventional column having internal walls, by means of: providing a plurality of mass exchange contact devices, each such device is furnished with barbotage means for barbotage of the volatile phase and the liquid phase, wherein the mass exchange contact devices are designed according to the first embodiment; the contact devices are arranged in a number of substantially horizontally situated rows, the rows each is disposed in the column at a predetermined level (i.e. one row above the other), and the rows are separated from each other with a conventional packing fitting; i.e. the packing fittings each is mounted above the corresponding row of contact devices; each such fitting comprises a plurality of layers situated one above the other; the contact devices are joined by the upper and lower trays common for each such row, and the trays are coupled substantially to the internal walls of the column.

The second embodiment of inventive device/method provides for operative separating the liquid phase into several individual layers, which allows orderly altering the concentration of the volatile phase during its passage through each such individual layer. The use of the fittings allows creating the aforesaid conditions for separating the liquid phase into the individual layers. This also enlarges the surface area between the liquid and volatile phases, ascertained by a constant contact surface of the fitting. The second embodiment of the method allows arranging separate movements of the phases that excludes a crossover flow of the liquid phase between the contact devices within the column during the mass-exchange process (i.e. when the volatile phase is introduced). All these factors contribute to the improvement of mass-exchange between the volatile and liquid phases and enhance the process efficiency.

Figure 6:
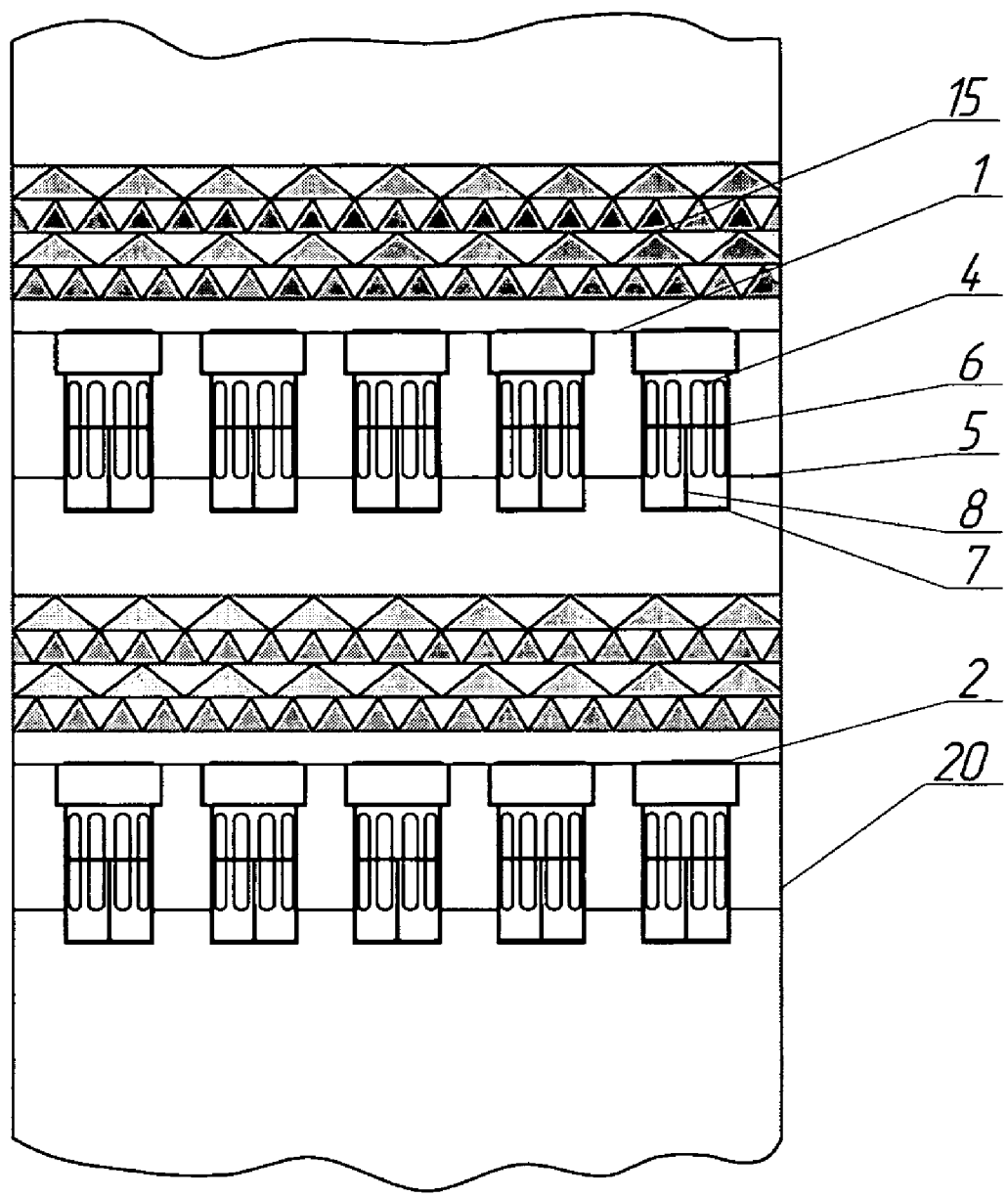
FIG. 6 shows a schematic sectional view of a column containing an upper row and a lower row of mass exchange contact devices designed according to the first embodiment, wherein each of the rows is combined with a packing fitting placed above thereof, according to the second embodiment of the present invention, wherein the volatile phase is not introduced.
Figure 7:
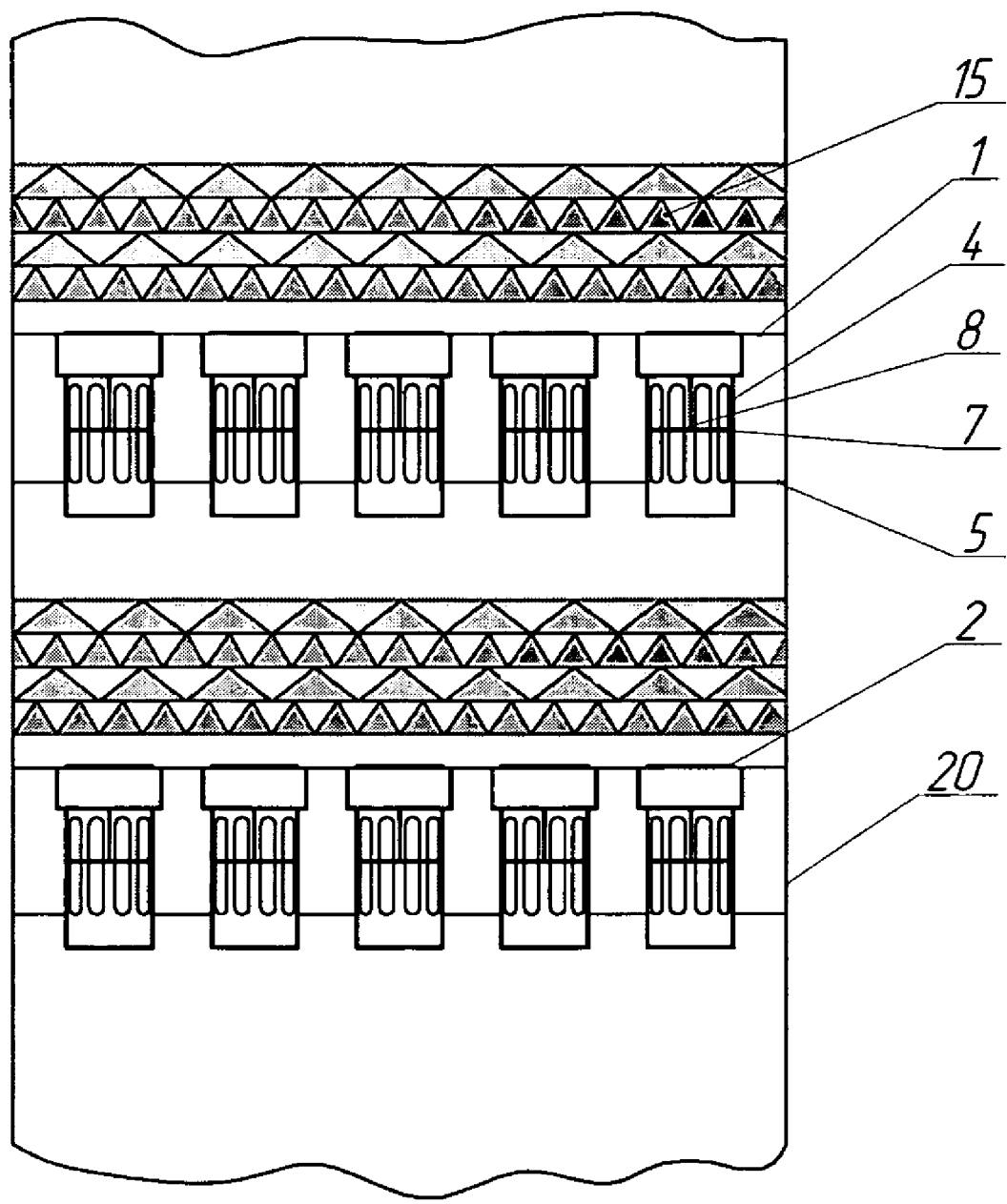
FIG. 7 shows a schematic sectional view of the second embodiment of the present invention shown on FIG. 6, wherein the volatile phase is introduced.

Referring to preferred examples of the second embodiment of the present invention, illustrated on FIGS. 6 and 7, a conventional column (20) supports at least two pluralities (substantially horizontally disposed rows) of mass exchange contact devices designed according to the first embodiment (depicted on FIG. 1). FIGS. 6 and 7 show an upper row and a lower row mounted within the column 20. Each mass exchange contact device (designed according to the first embodiment) includes the contact element 2 located in the top portion of the device, the tops of every contact element 2 of the same row of contact devices are secured to a common upper tray 1. Each contact device includes the casing 4 located below the contact element 2, the bottoms of every casing 4 of the same row is secured to a common lower tray 5.

In the second embodiment illustrated on FIGS. 6 and 7, the rows of contact devices are disposed in the column 20 one above the other, and separated from each other with a packing fitting (15). Each packing fitting 15 comprises a plurality of layers situated one above the other. Preferably, the layers are configured as members having a corrugated profile.

In the column 20, a mass-transfer surface is formed due to barbotage operatively taking place in the packing fitting 15. The mass-transfer surface is formed in a process of barbotage of the volatile phase through the liquid phase, which process has a stochastic character. Distinctly from the columns that contain known packing fittings, the combination of the inventive contact devices disclosed in the parent application with the packing fittings 15 (where the crossover flows between the contact devices are absent during the volatile phase introduction), the fittings 15 can perform another novel function, as explained below.

Figure 5:
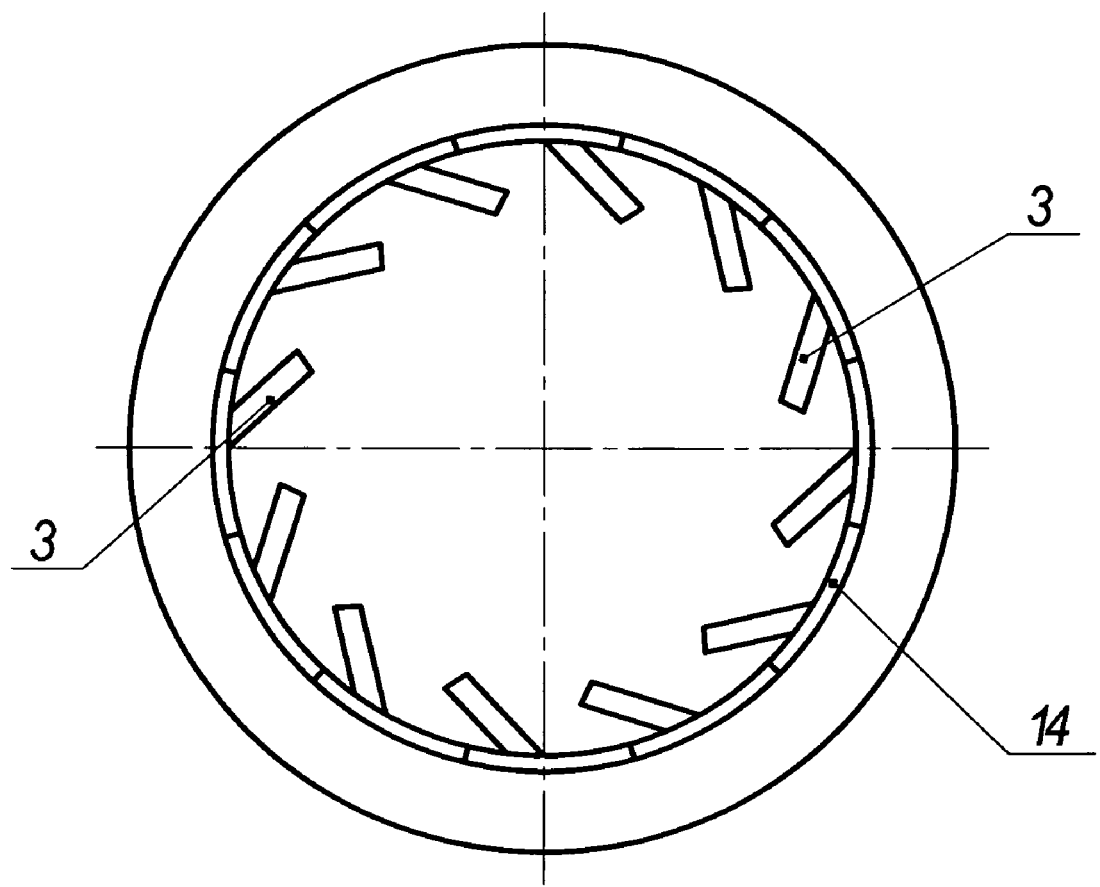
FIG. 5 is a plan sectional view from above of the inventive device, according to the first embodiment of the present invention.

In an initial cycle, at the time of introduction of the volatile phase into the column (shown on FIG. 5), a zone of contact of the phases is located in the fitting 15. The bi-directional valves are in their uppermost position. A transitional volume formed between the upper tray 1 and the lower tray 5 is empty.

At the time of absence of the volatile phase, wherein the liquid is flowing, the bi-directional valves descend into their lowest position (shown on FIG. 6) due to gravitation. The liquid phase flows from the fitting 15 into the transitional volume.

In the next cycle, the volatile phase lifts the bi-directional valves into their uppermost position (shown on FIG. 7), while the liquid phase flows over from the transitional volume into the fittings 15 of the contact devices of the below-positioned plurality. If the contact surface is constant, the volume of liquid is proportional to the height of the layer of liquid.

According to the known material balance equation, a change of concentration $dx_n/dt$ of the volatile component on a contact surface during the time of introduction of the volatile component is reversely proportional to the amount of liquid component brought into contact therewith:

$$dx_n/dt = -G/H^*(y_n - y_{n-1}).$$

If one divides the liquid component exemplarily into four layers, which layers are not being mixed, the $dx_n/dt$ value will be 4 times greater than for the whole volume of liquid on the contact surface. Therefore, the resultant change of concentration of the liquid component will be greater where the concentration is so altered along the height of liquid layer.

Thusly, the second embodiment of the invention allows increasing the efficiency of separation of the liquid and volatile components on the tray, decreasing energy consumed for the process, and reducing the content of metal in the columns.

Third Embodiment ('Continuation')

Figure 8:
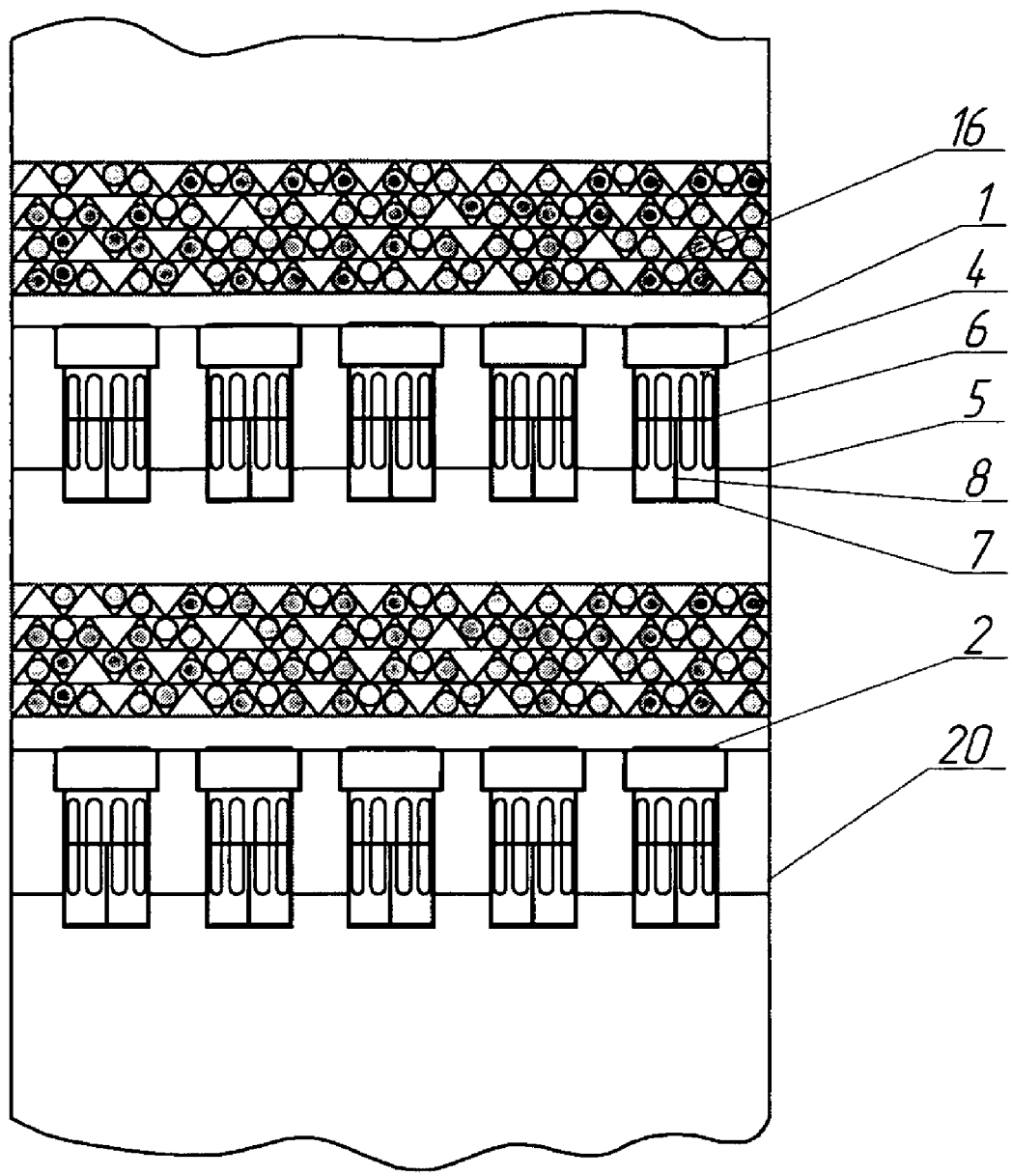
FIG. 8 shows a schematic sectional view of a column containing an upper row and a lower row of mass exchange contact devices designed according to the first embodiment, wherein each of the rows is combined with a packing fitting placed above thereof, and containing a catalytic material, according to the third embodiment of the present invention, wherein the volatile phase is not introduced.
Figure 9:
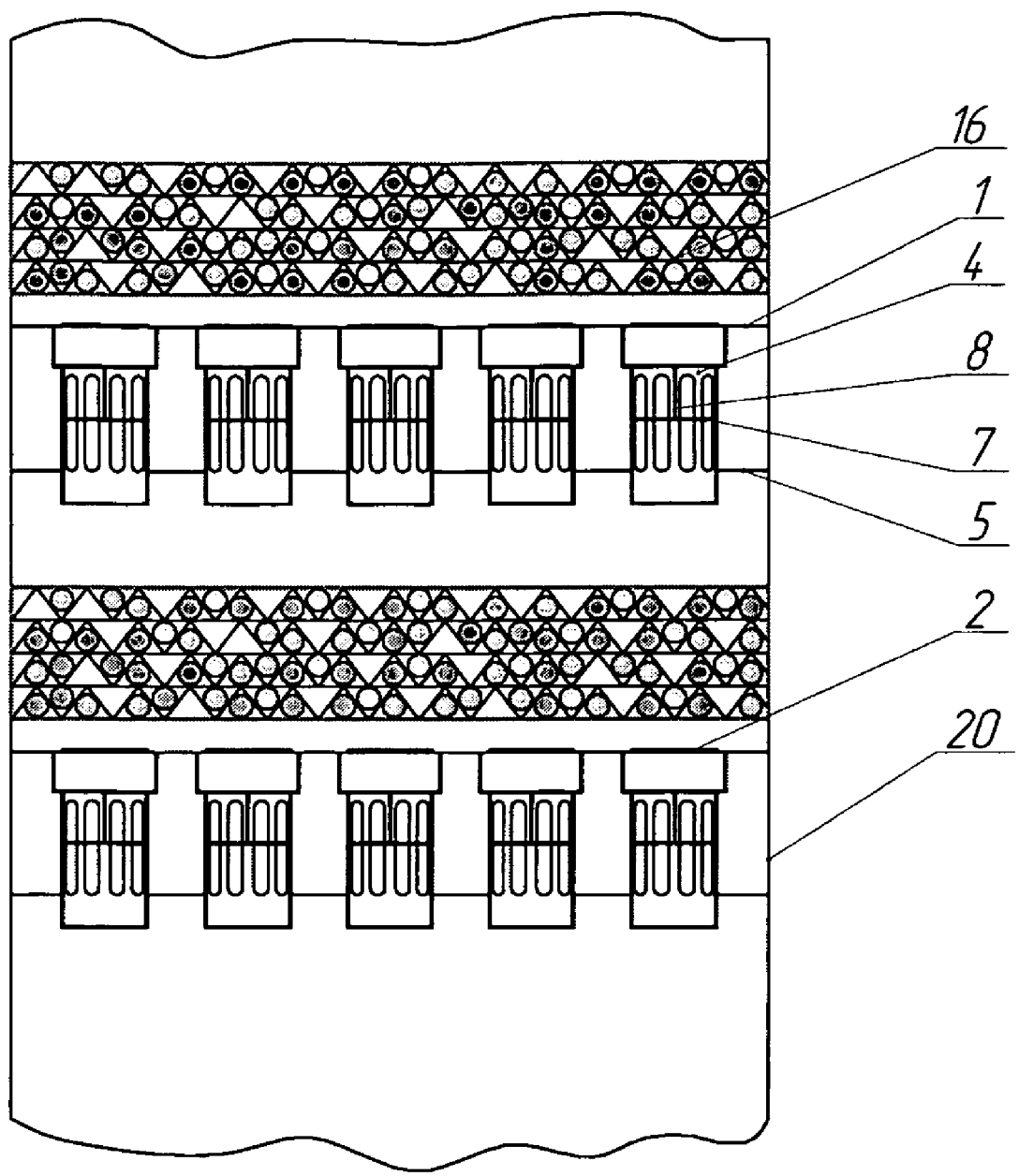
FIG. 9 shows a schematic sectional view of the third embodiment of the present invention shown on FIG. 8, wherein the volatile phase is introduced.

The third embodiment of inventive device for improvement of mass-exchange between a volatile phase and a liquid phase is illustrated on FIGS. 8 and 9. The third embodiment basically includes elements identical to the elements of the second embodiment. However, according to the third embodiment, the space between the layers of package fittings 15 is filled out with a suitable conventional catalytic material (16), which increases the efficiency of the mass-exchange process in a column.

A column 20 (FIGS. 8 and 9), wherein catalytic distillation takes place, contains an upper row and a lower row of mass exchange contact devices, designed according to the first embodiment, wherein each of the rows is combined with a packing fitting 15 placed above thereof, and containing the catalytic material 16. FIG. 8 shows the state wherein the volatile phase is not introduced, whereas FIG. 9 shows the state wherein the volatile phase is introduced.

Fourth Embodiment ('Continuation')

Figure 10:
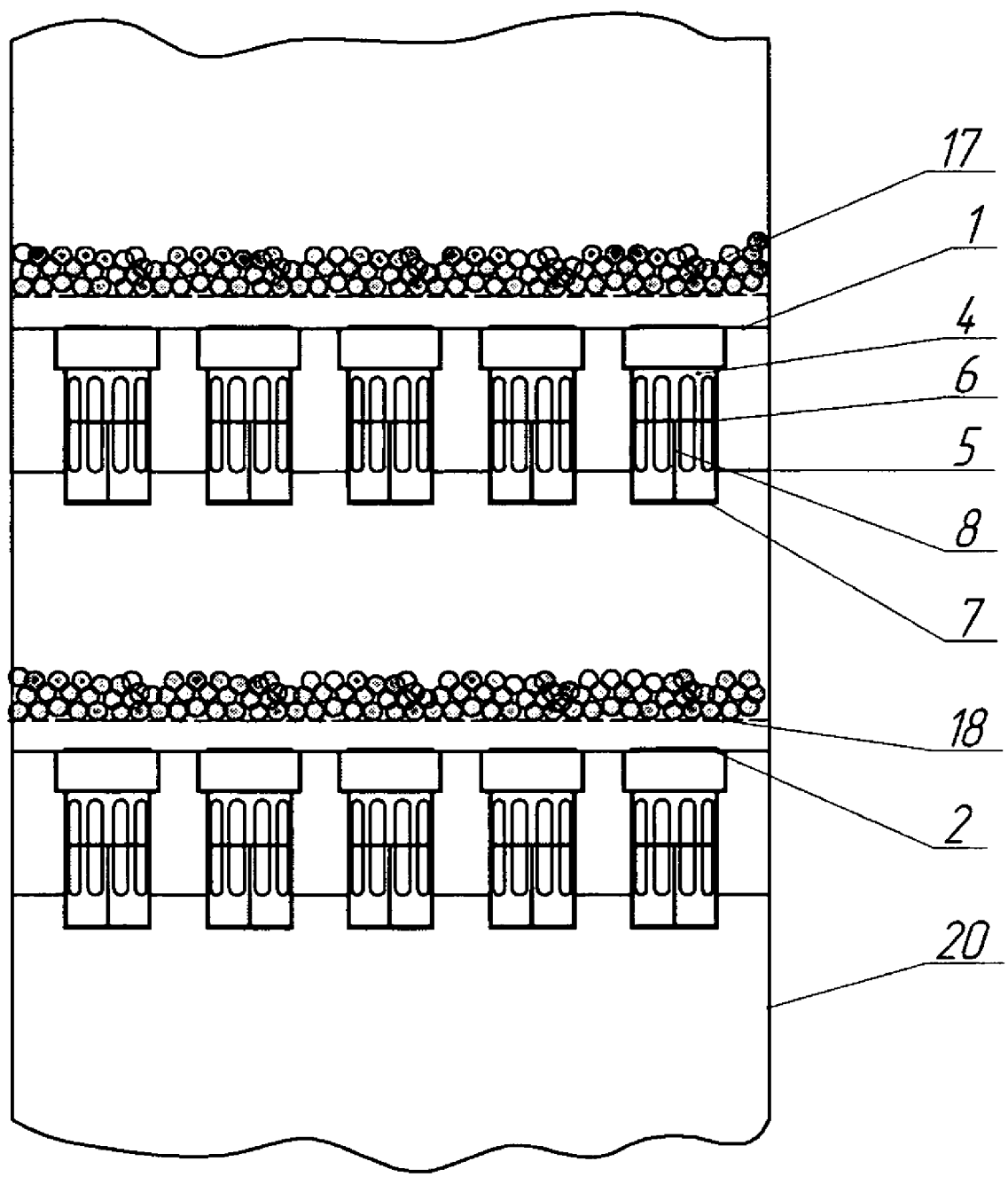
FIG. 10 shows a schematic sectional view of a column containing an upper plurality and a lower plurality of mass exchange contact devices designed according to the first embodiment, wherein each of the pluralities is combined with a grating disposed above thereof and a granular layer of catalytic material placed on the grating, according to the fourth embodiment of the present invention, wherein the volatile phase is not introduced.
Figure 11:
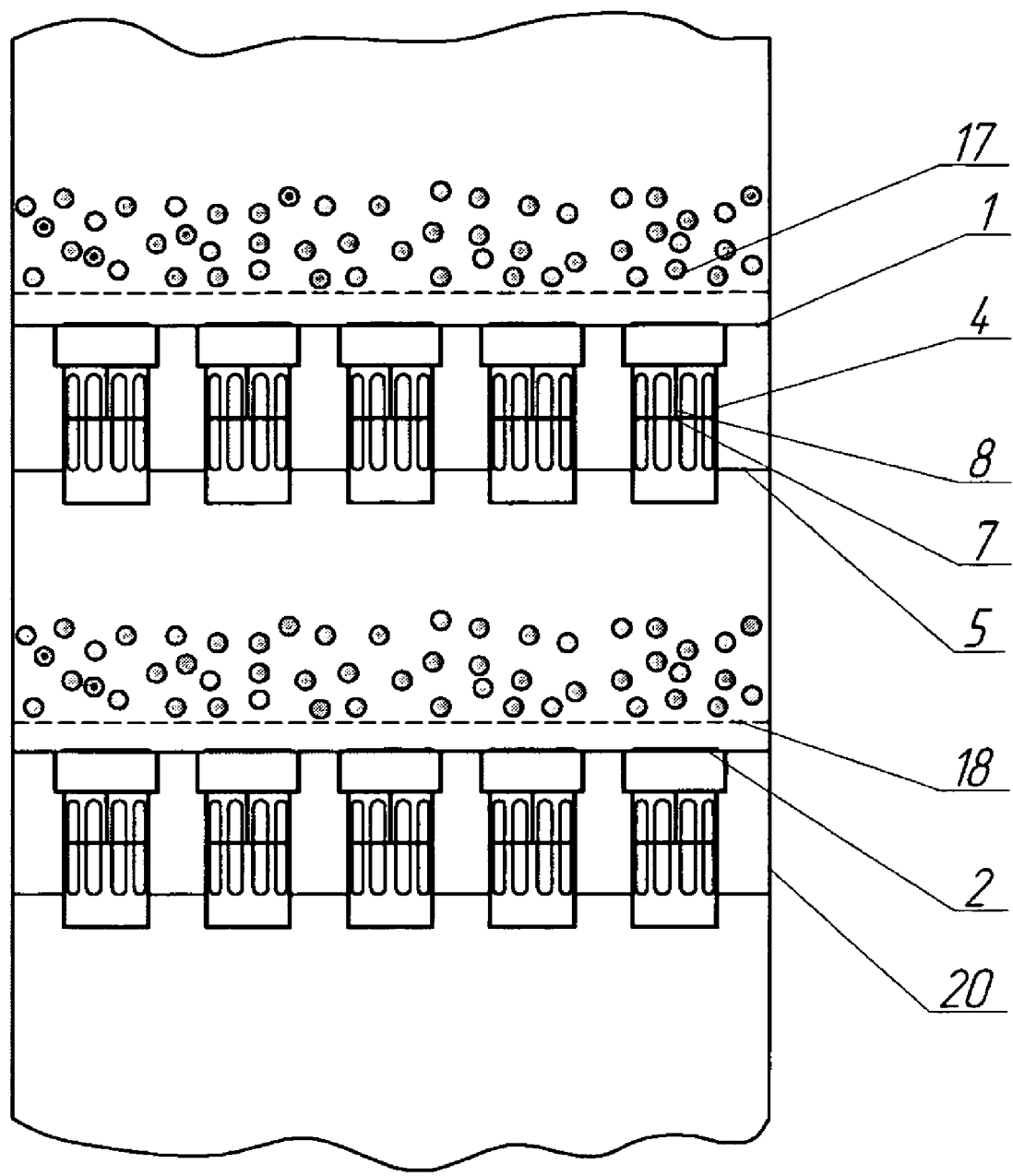
FIG. 11 shows a schematic sectional view of the fourth embodiment of the present invention shown on FIG. 10, wherein the volatile phase is introduced.

The fourth embodiment of inventive device/method for improvement of mass-exchange between a volatile phase and a liquid phase, illustrated on FIGS. 10 and 11, solves the same problem as the third embodiment does, though, in a different way. The fourth embodiment basically includes elements identical to the elements of the second embodiment, except for the package fittings 15, not included in the fourth embodiment of inventive device.

A column 20, wherein catalytic distillation takes place, contains an upper row and a lower row of mass exchange contact devices of the first embodiment, wherein each of the rows is combined with a grating (18) disposed above thereof and a granular layer (17) of catalytic material placed on the grating 18. The grating 18 has holes of a predetermined size, and the granular layer 17 consists of granules with a minimal size greater than the predetermined size of the grating 18. FIG. 8 shows the state wherein the volatile phase is not introduced, whereas FIG. 9 shows the state wherein the volatile phase is introduced. The liquid from the above-mounted device gets into the space of boiling catalyst of the lower-mounted device. The speed of flow of the volatile phase in the column should be maintained within a range for boiling the catalyst. At the end of the cycle, the layer 17 falls back on the grating 18 due to gravitation.

We claim:

1. A mass exchange contact device comprising:
   an upper tray;
   a contact element coupled to the upper tray;
   a lower tray disposed substantially in a parallel plane below the upper tray;
   a cylindrical casing including
      a plurality of vertically extended windows circumferentially disposed on the vertical walls of the casing and
      a plurality of circular orifices circumferentially disposed on the walls of the casing above the windows;
   a movable double-acting valve composed of two solid plates disposed one above the other and fixedly attached to a distance rod situated at the central axe of the valve; and
   a cover bushing disposed coaxially around the casing in the upper region thereof;
   wherein:
      said contact element restricts the upward movement of said valve, whereas the bottom edge of said casing restricts the downward movement of said valve, the bottom edges of the windows are disposed at the level of said lower tray, and the exterior of said contact element is communicated with the interior of said casing via the inner space of said bushing and via the orifices.

2. A combination of the mass-exchange contact devices according to claim 1 arranged in the column, said combination comprising:
   at least two rows of said devices, each said row is situated at a predetermined level in the column, and is supported by said upper and lower trays common for each said device of one said row, said upper and lower trays are fixed substantially to said column; and
   a number of packing fittings supported substantially by said column, each of said packing fittings is disposed above one of said rows, wherein each said packing fitting comprises a plurality of layers situated one above the other.

3. The combination according to claim 2, arranged in a catalytic distillation column, wherein said packing fittings are filled with a catalytic material placed between said layers.

4. A combination of the mass-exchange contact devices according to claim 1 arranged in a catalytic distillation column, said combination comprising:
   at least two rows of said devices, each said row is situated at a predetermined level in the column, and is supported substantially by said upper and lower trays common for each said device of one said row, said upper and lower trays are substantially fixed to said column;
   a number of gratings, each disposed above one of said rows, each said grating has holes of a predetermined size; and
   a number of granular layers of catalytic material, each said granular layer is placed on said grating; and the granular layer consists of granules with a minimal size greater than the predetermined size of said holes of the grating.

5. A mass exchange contact device comprising:
   an upper tray;
   a contact element coupled to the upper tray;
   a lower tray disposed below the upper tray;
   a cylindrical casing including a number of predetermined holes;
   a movable double-acting valve composed of two solid plates disposed one above the other and fixedly attached to a distance rod; and
   a cover bushing disposed coaxially around the casing in the upper region thereof; wherein:
      said contact element restricts the upward movement of said valve, whereas the bottom edge of said casing restricts the downward movement of said valve, and the exterior of said contact element is communicated with the interior of said casing via the inner space of said bushing and via said holes.

* * * * *